(12) United States Patent
Yurchenko

(10) Patent No.: US 7,843,835 B2
(45) Date of Patent: Nov. 30, 2010

(54) SYSTEM AND METHOD OF MONITORING AN INTERNET BASED TELEPHONE CALL ROUTING SYSTEM

(75) Inventor: Vitaliy G. Yurchenko, Newton, MA (US)

(73) Assignee: iBasis, Inc., Burlington, MA (US)

( * ) Notice: Subject to any disclaimer, the term of this patent is extended or adjusted under 35 U.S.C. 154(b) by 1246 days.

(21) Appl. No.: 11/365,847

(22) Filed: Mar. 2, 2006

(65) Prior Publication Data

US 2006/0146783 A1 Jul. 6, 2006

Related U.S. Application Data

(63) Continuation-in-part of application No. 10/646,687, filed on Aug. 25, 2003, now Pat. No. 7,577,131, which is a continuation-in-part of application No. 10/298,208, filed on Nov. 18, 2002, now Pat. No. 7,529,225.

(60) Provisional application No. 60/331,479, filed on Nov. 16, 2001.

(51) Int. Cl.
*H04L 12/26* (2006.01)
*H04L 1/00* (2006.01)
*H04J 3/14* (2006.01)
*H04J 1/16* (2006.01)

(52) U.S. Cl. .................................................. 370/241

(58) Field of Classification Search ......... 370/351–353, 370/401, 252, 356, 241, 248, 230, 395, 227, 370/335, 402; 379/93, 114, 242, 115, 218, 379/211, 220, 237, 196, 67, 441, 119, 265, 379/188, 35, 379, 134, 229, 246, 111, 201, 379/213, 224; 455/405, 408, 445, 432, 428, 455/555, 545, 552; 709/224, 223

See application file for complete search history.

(56) References Cited

U.S. PATENT DOCUMENTS

| 4,726,056 | A  | * | 2/1988  | An et al.        | 379/114.01 |
|-----------|----|---|---------|------------------|------------|
| 5,696,811 | A  | * | 12/1997 | Maloney et al.   | 379/265.07 |
| 5,867,566 | A  | * | 2/1999  | Hogan et al.     | 379/115.01 |
| 5,873,099 | A  | * | 2/1999  | Hogan et al.     | 707/204    |
| 6,049,543 | A  | * | 4/2000  | Sauer et al.     | 370/335    |
| 6,434,537 | B1 | * | 8/2002  | Grimes           | 705/40     |
| 6,480,597 | B1 | * | 11/2002 | Kult et al.      | 379/242    |
| 6,493,437 | B1 | * | 12/2002 | Olshansky        | 379/114.13 |
| 6,504,907 | B1 | * | 1/2003  | Farris et al.    | 379/35     |
| 6,654,453 | B1 | * | 11/2003 | Malik            | 379/201.01 |
| 6,668,046 | B1 | * | 12/2003 | Albal            | 379/119    |
| 6,680,935 | B1 | * | 1/2004  | Kung et al.      | 370/352    |
| 6,687,245 | B2 | * | 2/2004  | Fangman et al.   | 370/356    |
| 6,724,887 | B1 | * | 4/2004  | Eilbacher et al. | 379/265.03 |
| 6,760,324 | B1 | * | 7/2004  | Scott et al.     | 370/352    |
| 6,775,267 | B1 | * | 8/2004  | Kung et al.      | 370/352    |
| 6,856,616 | B1 | * | 2/2005  | Schuster et al.  | 370/352    |
| 6,970,924 | B1 | * | 11/2005 | Chu et al.       | 709/224    |

(Continued)

*Primary Examiner*—Pankaj Kumar
*Assistant Examiner*—Prenell P Jones
(74) *Attorney, Agent, or Firm*—Nixon & Vanderhye, PC

(57) ABSTRACT

A system and method of monitoring Voice over the Internet Protocol (VoIP) and facsimile over Internet Protocol (FoIP) calling over the Internet includes compiling information about each call after the call is terminated. By compiling information about each of the calls immediately after they are terminated, the system can quickly generate billing reports. The system can also quickly react to developing problems.

33 Claims, 10 Drawing Sheets

U.S. PATENT DOCUMENTS

| | | | |
|---|---|---|---|
| 7,076,048 B2 * | 7/2006 | Lee et al. | 379/265.01 |
| 7,136,475 B1 * | 11/2006 | Rogers et al. | 379/213.01 |
| 7,308,094 B1 * | 12/2007 | Jean et al. | 379/379 |
| 2001/0028706 A1 * | 10/2001 | Nolting | 379/134 |
| 2002/0132638 A1 * | 9/2002 | Plahte et al. | 455/555 |
| 2003/0031134 A1 * | 2/2003 | Chiu | 370/252 |
| 2005/0052996 A1 * | 3/2005 | Houck et al. | 370/230 |
| 2007/0019559 A1 * | 1/2007 | Pittelli et al. | 370/248 |
| 2007/0041545 A1 * | 2/2007 | Gainsboro | 379/188 |

* cited by examiner

SYSTEM AND METHOD OF MONITORING AN INTERNET BASED TELEPHONE CALL ROUTING SYSTEM

This application is a continuation-in-part of U.S. application Ser. No. 10/646,687 filed Aug. 25, 2003 now U.S. Pat. No. 7,577,131 which is a Continuation-In-Part of U.S. application Ser. No. 10/298,208, filed Nov. 18, 2002, now U.S. Pat. No. 7,529,225 the disclosure of both of which is hereby incorporated by reference. The application also claims priority to U.S. Provisional Patent Application Ser. No. 60/331,479, filed Nov. 16, 2001, and U.S. Utility application Ser. No. 10/094,671, filed Mar. 7, 2002, the disclosure of both of which are hereby incorporated by reference.

BACKGROUND OF THE INVENTION

1. Field of the Invention

The invention relates generally to the field of communications, and more specifically to a network configured for Voice over Internet Protocol (VoIP) and/or Facsimile over Internet Protocol (FoIP).

2. Background of the Related Art

Historically, most wired voice communications were carried over the Public Switched Telephone Network (PSTN), which relies on switches to establish a dedicated circuit between a source and a destination to carry an analog or digital voice signal. In the case of a digital voice signal, the digital data is essentially a constant stream of digital data. More recently, Voice over Internet Protocol (VoIP) was developed as a means for enabling speech communication using digital, packet-based, Internet Protocol (IP) networks such as the Internet. A principle advantage of IP is its efficient bandwidth utilization. VoIP may also be advantageous where it is beneficial to carry related voice and data communications over the same channel, to bypass tolls associated with the PSTN, to interface communications originating with Plain Old Telephone Service (POTS) with applications on the Internet, or for other reasons. As discussed in this specification, the problems and solutions related to VoIP may also apply to Facsimile over Internet Protocol (FoIP).

Throughout the description that follows there are references to analog calls over the PSTN. This phrase could refer to analog or digital data streams that carry telephone calls through the PSTN. This is distinguished from VoIP or FoIP format calls, which are formatted as digital data packets.

FIG. 1 is a schematic diagram of a representative architecture in the related art for VoIP communications between originating telephone 100 and destination telephone 145. In alternative embodiments, there may be multiple instances of each feature or component shown in FIG. 1. For example, there may be multiple gateways 125 controlled by a single controller 120. There may also be multiple controllers 120 and multiple PSTN's 115. Hardware and software components for the features shown in FIG. 1 are well-known. For example, controllers 120 and 160 may be Cisco PGW 2200 nodes, and gateways 125 and 135 may be Cisco AS5300 voice gateways.

To initiate a VoIP session, a user lifts a handset from the hook of originating telephone 100. A dial tone is returned to the originating telephone 100 via Private Branch Exchange (PBX) 110. The user dials a telephone number, which causes the PSTN 115 to switch the call to the originating gateway 125, and additionally communicates a destination for the call to the originating gateway 125. The gateway will determine which destination gateway a call should be sent to using a look-up table resident within the gateway 125, or it may consult the controller 120 for this information.

The gateway then attempts to establish a call with the destination telephone 145 via the VoIP network 130, the destination gateway 135, signaling lines 155 and the PSTN 140. If the destination gateway and PSTN are capable of completing the call, the destination telephone 145 will ring. When a user at the destination telephone 145 lifts a handset and says "hello?" a first analog voice signal is transferred through the PSTN 140 to the destination gateway 135 via lines 155. The destination gateway 135 converts the first analog voice signal originating at the destination telephone 145 into packetized digital data (not shown) and appends a destination header to each data packet. The digital data packets may take different routes through the VoIP network 130 before arriving at the originating gateway 125. The originating gateway 125 assembles the packets in the correct order, converts the digital data to a second analog voice signal (which should be a "hello?" substantially similar to the first analog signal), and forwards the second analog voice signal to the originating telephone 100 via lines 155, PSTN 115 and PBX 110. A user at the originating telephone 100 can speak to a user at the destination telephone 145 in a similar manner. The call is terminated when the handset of either the originating telephone 100 or destination telephone 145 is placed on the hook of the respective telephone. In the operational example described above, the telephone 105 is not used.

In the related art, the controllers 120 and 160 may provide signaling control in the PSTN and a limited means of controlling a gateway at one end of the call. It will be appreciated by those skilled in the art that, in some configurations, all or part of the function of the controllers 120 and 160 as described above may be embedded into the gateways 125 and 135, respectively.

It is necessary to track each individual call that is placed to generate billing and payment information. The billing system must be capable of providing lists that identify, for each call, the calling party, the called party, the duration of the call, and the time of day the call was placed. The call information is then combined with rate information to determine how much should be charged for each call, and how much the system should pay to other service providers for completing calls to called parties Prior art systems typically track information about each call to support the billing process. The tracked information is then complied at the end of each week or each day to determine who owes what for each call. This batch processing is time/resource consuming, and necessarily involves a delay between the time that calls are completed, and the time that bills are generated and sent. Also, because the call information is batch processed at the end of each week/day, there will be a delay before users even know what they owe for placed calls.

SUMMARY OF THE INVENTION

An object of the invention is to solve at least one or more of the above problems and/or disadvantages in whole or in part and to provide at least the advantages described hereinafter.

An improved control architecture for VoIP/FoIP communications system that embodies the invention processes call information shortly after each call is completed to determine the charges associated with the call. This eliminates the need to perform batch processing at the end of the day/week. This also means that the charges associated with a call will be known shortly after the call is completed.

In addition, by closely monitoring the status of all calls carried by the system, the system controllers can determine when portions of the system are approaching maximum capacity. This allows for better load balancing.

Furthermore, the system may be capable of determining when system assets are experiencing problems by monitoring the status of calls. This information can then be used to take corrective action. The call information tracked by the system might also be used to make better routing decisions. For instance, if the system notices that a large percentage of call setup requests for calls placed to a certain area are not resulting in a connected call, the system can look for trouble with the assets at that location.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENTS

Figure 1:
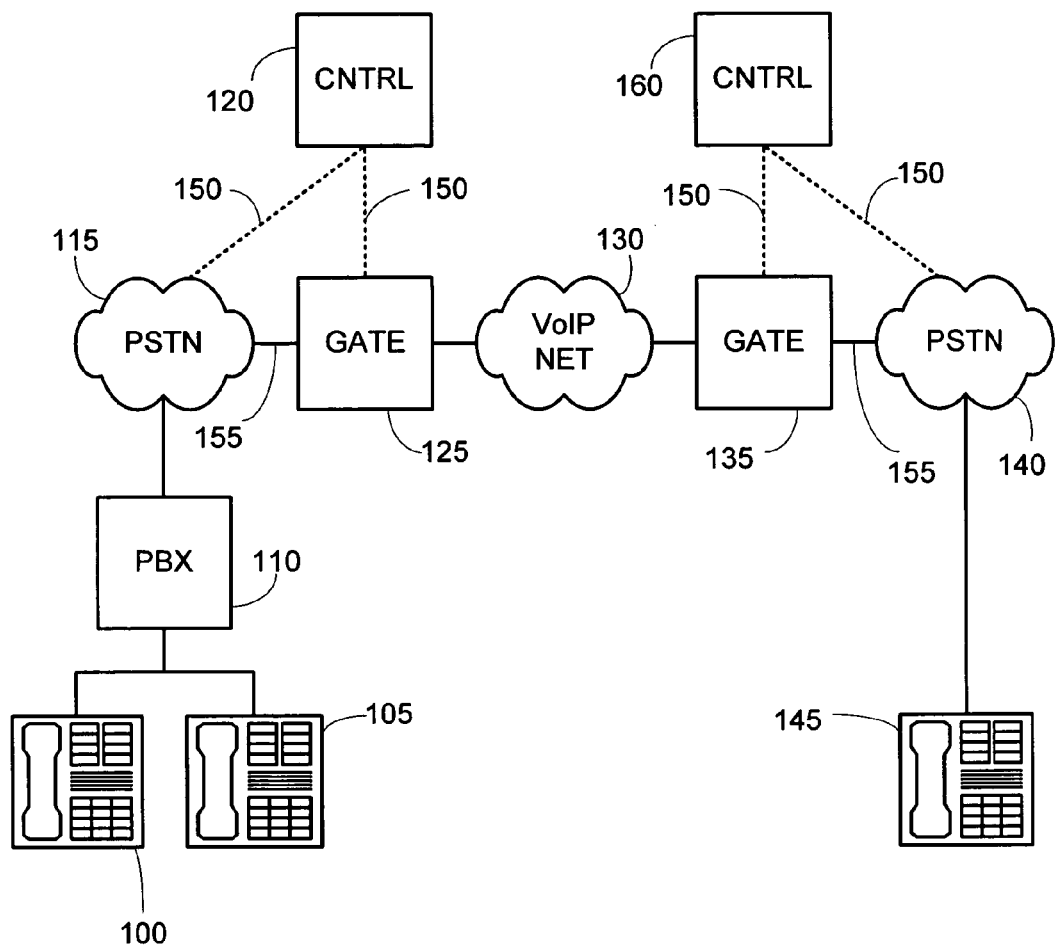
FIG. 1 is a schematic diagram of a system architecture providing VoIP communications, according to the background.
Figure 2:
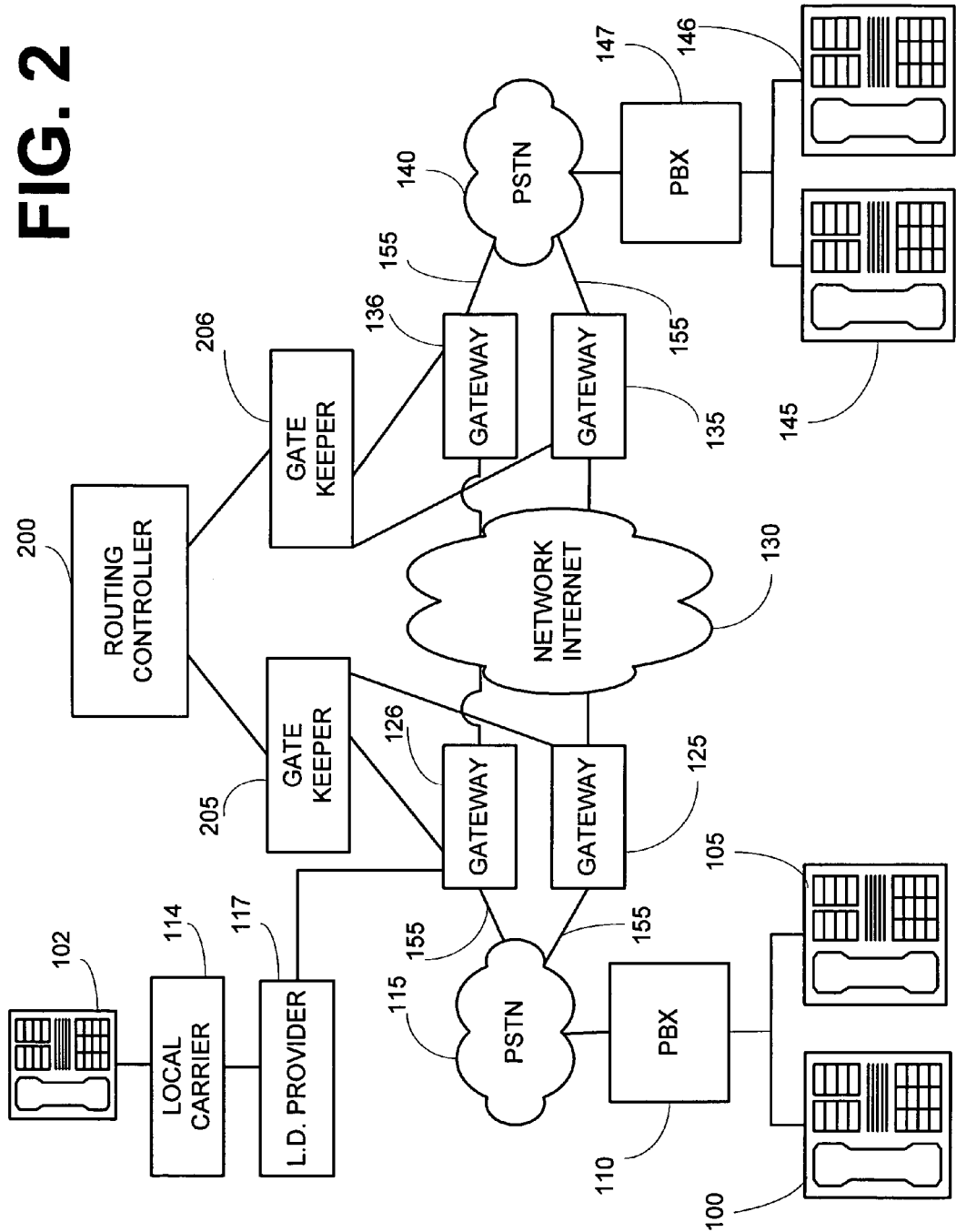
FIG. 2 is a schematic diagram of a system architecture providing VoIP/FoIP communications, according to a preferred embodiment of the invention.

A system embodying the invention is depicted in FIG. 2. The system includes telephones 100/105 connected to a private branch exchange (PBX) 110. The PBX, in turn, is connected to the PSTN 115. In addition, telephones 102 may be coupled to a local carrier 114, which in turn routes long distance calls to one or more long distance service providers 117. Those skilled in the art will recognize that calls could also originate from cellular telephones, computer based telephones, and/or other sources, and that those calls could also be routed through various carriers and service providers. Regardless of where the calls are originating from, they are ultimately forwarded to an originating gateway 125/126.

The originating gateways 125/126 function to convert an analog call into digital packets, which are then sent via the Internet 130 to a destination gateway 135/136. In some instances, the gateways may receive a call that has already been converted into a digital data packet format. In this case, the gateways will function to communicate the received data packets to the proper destination gateways. However, the gateways may modify the received data packets to include certain routing and other formatting information before sending the packets on to the destination gateways.

The gateways 125/126/135/136 are coupled to one or more gatekeepers 205/206. The gatekeepers 205/206 are coupled to a routing controller 200. Routing information used to inform the gateways about where packets should be sent originates at the routing controller.

One of skill in the art will appreciate that although a single routing controller 200 is depicted in FIG. 2, a system embodying the invention could include multiple routing controllers 200. In addition, one routing controller may be actively used by gatekeepers and gateways to provide routing information, while another redundant routing controller may be kept active, but unused, so that the redundant routing controller can step in should the primary routing controller experience a failure. As will also be appreciated by those skilled in the art, it may be advantageous for the primary and redundant routing controllers to be located at different physical locations so that local conditions affecting the primary controller are not likely to also result in failure of the redundant routing controller.

In a preferred embodiment of the invention, as depicted in FIG. 2, the digital computer network 130 used to communicate digital data packets between gateways may be compliant with the H.323 recommendation from the International Telecommunications Union (ITU). Use of H.323 may be advantageous for reasons of interoperability between sending and receiving points, because compliance with H.323 is not necessarily tied to any particular network, platform, or application, because H.323 allows for management of bandwidth, and for other reasons. Thus, in a preferred embodiment, one function of the originating gateways 125 and 126 and the terminating gateways 135 and 136 may be to provide a translation of data between the PSTN=s 115/140 and the H.323-based VoIP network 130. Moreover, because H.323 is a framework document, the ITU H.225 protocol may be used for communication and signaling between the gateways 125/126 and 135/136, and the IETF RTP protocol may be used for audio data between the gateways 125/126 and 135/136, and RAS (Registration, Admission, and Status) protocol may be used in communications with the gatekeepers 205/206.

According to the invention, the gatekeeper 205 may perform admission control, address translation, call signaling, call management, or other functions to enable the communication of voice and facsimile traffic over the PSTN networks 115/140 and the VoIP network 130. The ability to provide signaling for networks using Signaling System No. 7 (SS7) and other signaling types may be advantageous over network schemes that rely on gateways with significantly less capability. For example, related art gateways not linked to the gatekeepers of the present invention may only provide signaling for Multi-Frequency (MF), Integrated Services Digital Network (ISDN), or Dual Tone Multi-Frequency (DTMF).

According to a preferred embodiment of the present invention, the gatekeeper 205 may further provide an interface between different gateways, and the routing controller 200. The gatekeeper 205 may transmit routing requests to the routing controller 200, receive an optimized route from the routing controller 200, and execute the route accordingly.

Persons skilled in the art of communications will recognize that gatekeepers may also communicate with other gatekeepers to manage calls outside of the originating gatekeepers area of control. Additionally, it may be advantageous to have multiple gatekeepers linking a particular gateway with a particular routing controller so that the gatekeepers may be used as alternates, allowing calls to continue to be placed to all available gateways in the event of failure of a single gatekeeper. Moreover, although the gatekeeping function may be logically separated from the gateway function, embodiments where the gatekeeping and gateway functions are combined onto a common physical host are also within the scope of the invention.

In a system embodying the present invention, as shown in FIG. 2, a routing controller 200 is logically coupled to gateways 125/126 and 135/136 through gatekeepers 205/206. The routing controller 200 contains features not included in the prior art signaling controllers 120 and 160 of the prior art systems described above, as will be described below. Routing controller 200 and gatekeepers 205/206 may be hosted on one or more network-based servers which may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™, Java Virtual Machine or other operating system or platform. Detailed descriptions of the functional portions of a typical routing controller embodying the invention is provided below.

Figure 3:
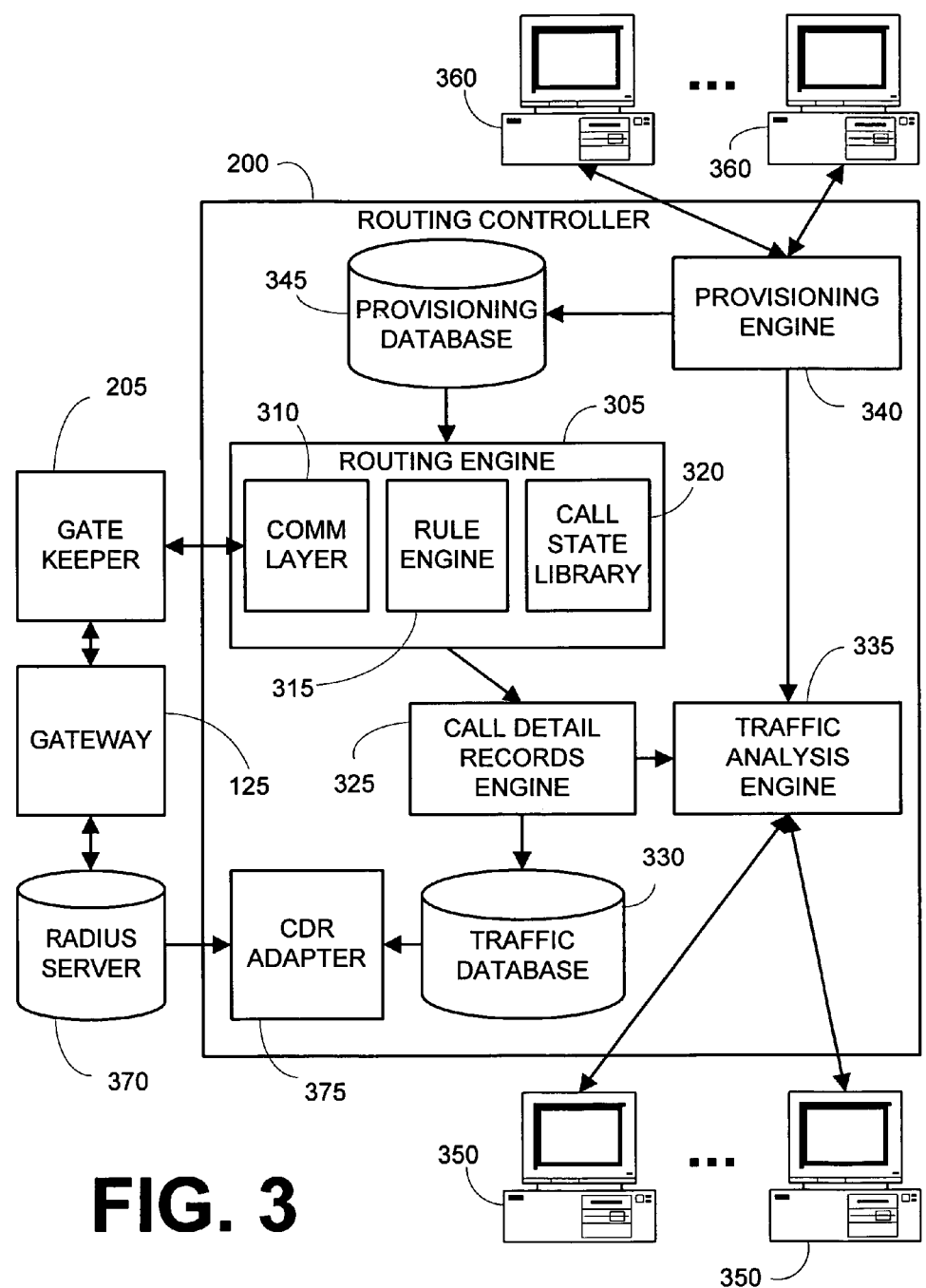
FIG. 3 is a schematic diagram of a system architecture providing improved control for VoIP communications, according to a preferred embodiment of the invention.

As indicated in FIG. 3, a routing controller 200 may include a routing engine 305, a Call Detail Record (CDR) engine 325, a traffic database 330, a traffic analysis engine 335, a provisioning engine 340, and a provisioning database 345. The routing engine 305, CDR engine 325, traffic analysis engine 335, and provisioning engine 340 may exist as independent processes and may communicate to each other through standard interprocess communication mechanisms. They might also exist on independent hosts and communicate via standard network communications mechanisms.

In alternative embodiments, the touting engine 305, Call Detail Record (CDR) engine 325, traffic database 330, traffic analysis engine 335, provisioning engine 340, or provisioning database 345 may be duplicated to provide redundancy. For instance, two CDR engines 325 may function in a master-slave relationship to manage the generation of billing data.

The routing engine 305 may include a communications layer 310 to facilitate an interface between the routing engine 305 and the gatekeepers 205/206. Upon receipt of a routing request from a gatekeeper, the routing engine 305 may determine the best routes for VoIP traffic based upon one or more predetermined attributes such as the selected carrier service provider, time of day, a desired Quality of Service (QoS), cost, or other factors. The routing information generated by the routing engine 305 could include a destination gateway address, and/or a preferred Internet Service Provider to use to place the call traffic into the Internet. Moreover, in determining the best route, the rule engine 315 may apply one or more exclusionary rules to candidate routes, based upon known bad routes, provisioning data from provisioning database 345, or other data.

The routing engine 305 may receive more than one request to route a single call. For example, when a first routing attempt was declined by the terminating gateway, or otherwise failed to result in a connection, or where a previous routing attempt resulted in a disconnect other than a hang-up by the originator or recipient, then the routing engine may receive a second request to route the same call. To provide redundancy, the routing engine 305 may generate alternative routes to a particular far-end destination. In a preferred embodiment of the invention, when the routing engine receives a routing request, the routing engine will return both preferred routing information, and alternative routing information. In this instance, information for at least one next-best route will be immediately available in the event of failure of the preferred route. In an alternative embodiment, routing engine 305 may determine a next-best route only after the preferred route has failed. An advantage of the latter approach is that routing engine 305 may be able to better determine the next-best route with the benefit of information concerning the most recent failure of the preferred route.

To facilitate alternative routing, and for other reasons, the routing engine 305 may maintain the state of each VoIP call in a call state library 320. For example, routing engine 305 may store the state of a call as "set up," "connected," "disconnected," or some other state.

Routing engine 305 may further format information about a VoIP call such as the originator, recipient, date, time, duration, incoming trunk group, outgoing trunk group, call states, or other information, into a Call Detail Record (CDR). Including the incoming and outgoing trunk group information in a CDR may be advantageous for billing purposes over merely including IP addresses, since IP addresses may change or be hidden, making it difficult to identify owners of far-end network resources. Routing engine 305 may store CDR's in a call state library 320, and may send CDR's to the CDR engine 325 in real time, at the termination of a call, or at other times.

The CDR engine 325 may store CDR's to a traffic database 330. To facilitate storage, the CDR engine 325 may format CDR's as flat files, although other formats may also be used. The CDR's stored in the traffic database 330 may be used to generate bills for network services. The CDR engine 325 may also send CDR's to the traffic analysis engine 335.

Data necessary for the billing of network services may also be stored in a Remote Authentication Dial-In User Service (RADIUS) server 370. In fact, in some embodiments, the data stored in the RADIUS server may be the primary source of billing information. The RADIUS server 370 may also directly communicate with a gateway 125 to receive and store data such as incoming trunk group, call duration, and IP addresses of near-end and far-end destinations. The CDR adapter 375 may read data from both the traffic database 330 and the RADIUS server 370 to create a final CDR. The merged data supports customer billing, advantageously including information which may not be available from RADIUS server 370 alone, or the traffic database 330 alone.

The traffic analysis engine 335 may collect CDR's, and may automatically perform traffic analysis in real time, near real time, or after a predetermined delay. In addition, traffic analysis engine 335 may be used to perform post-traffic analysis upon user inquiry. Automatic or user-prompted analysis may be performed with reference to a predetermined time period, a specified outgoing trunk group, calls that exceed a specified duration, or according to any other variable(s) included in the CDR's.

The provisioning engine 340 may perform tasks necessary to route particular calls over the Internet. For example, the provisioning engine 340 may establish or modify client account information, authorize a long distance call, verify credit, assign phone numbers where the destination resides on a PSTN network, identify available carrier trunk groups, generate routing tables, or perform other tasks. In one embodiment of the invention, provisioning may be performed automatically. In another embodiment, provisioning may be performed with user input. Hybrid provisioning, that is, a combination of automated and manual provisioning, may also be performed. The provisioning engine 340 may further cause provisioning data to be stored in a provisioning database 345.

Client workstations 350 and 360 may be coupled to routing controller 200 to provide a user interface. As depicted in FIG. 3, the client(s) 350 may interface to the traffic analysis engine 335 to allow a user to monitor network traffic. The client(s) may interface to the provisioning engine 340 to allow a user to view or edit provisioning parameters. In alternative embodiments, a client may be adapted to interface to both the traffic analysis engine 335 and provisioning engine 340, or to interface with other features of routing controller 200.

In a system embodying the invention, as shown in FIG. 2, the gateways 125/126 would first receive a request to set up a telephone call from the PSTN, or from a Long Distance Provider 117, or from some other source. The request for setting up the telephone call would typically include the destination telephone number. In order to determine which destination gateway should receive the packets, the gateway would consult the gatekeeper 205.

The gatekeeper 205, in turn may consult the routing controller 200 to determine the most appropriate destination gateway. In some situations, the gatekeeper may already have the relevant routing information. In any event, the gatekeeper would forward the routing information to the originating gateway 125/126, and the originating gateway would then send the appropriate packets to the appropriate destination gateway. As mentioned previously, the routing information provided by the gatekeeper may include just a preferred destination gateway, or it may include both the preferred destination gateway information, and information on one or more next-best destination gateways. The routing information may also include a preferred route or path onto the Internet, and one or more next-best routes. The routing information may further include information about a preferred Internet Service Provider.

Figure 4:
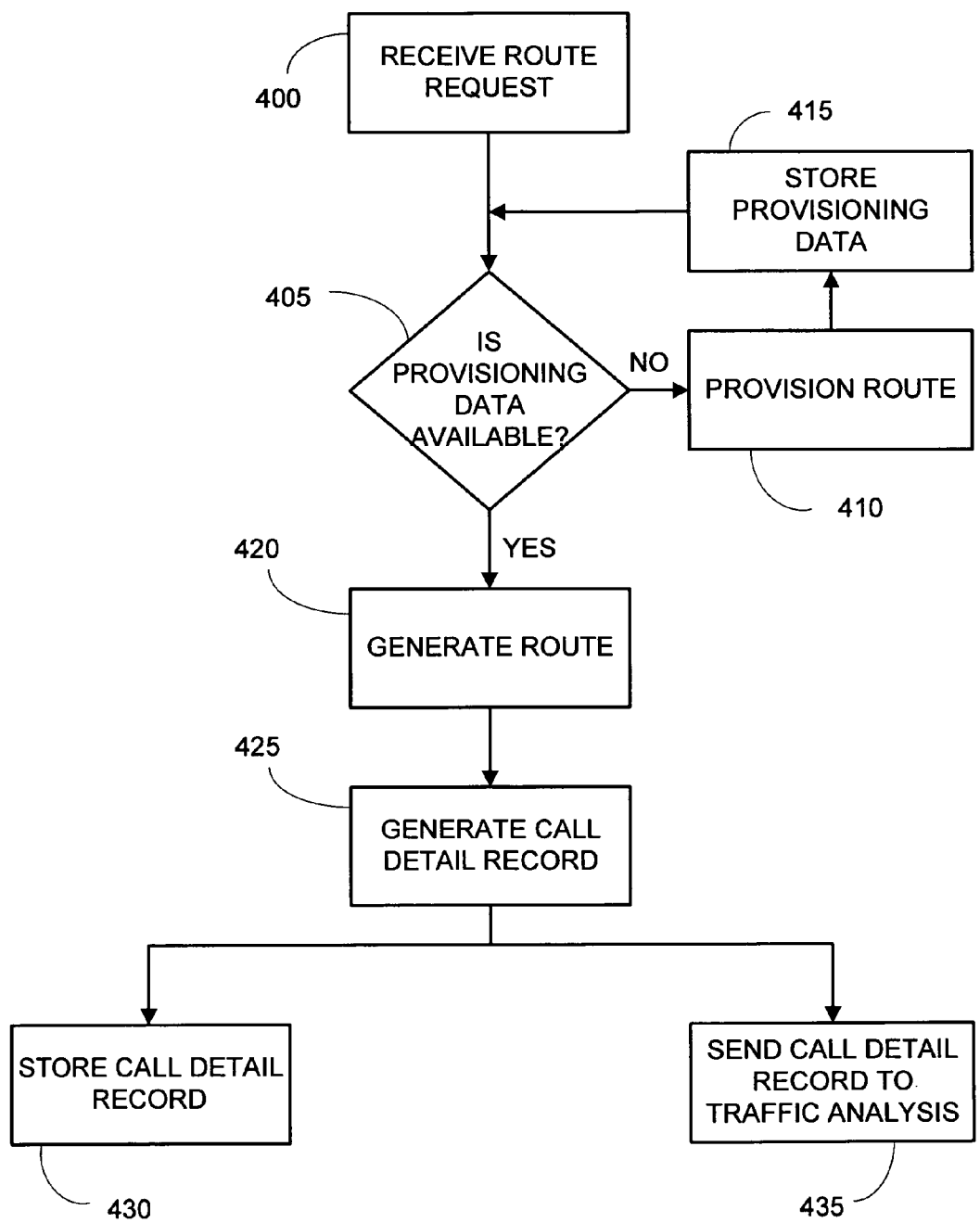
FIG. 4 is a flow diagram illustrating a method for routing control, according to a preferred embodiment of the invention.

FIG. 4 is a flow chart illustrating a method embodying the invention for using the routing controller 200. In step 400, the routing controller 200 receives a routing request from either a gatekeeper, or a gateway. In step 405, a decision is made as to whether provisioning data is available to route the call. If the provisioning data is not available, the process advances to step 410 to provision the route, then to step 415 for storing the provisioning data before returning to decision step 405.

If, on the other hand, if it is determined in step 405 that provisioning data is available, then the process continues to step 420 for generating a route. In a preferred embodiment of the invention, step 420 may result in the generation of information for both a preferred route, and one or more alternative routes. The alternative routes may further be ranked from best to worst.

The routing information for a call could be simply information identifying the destination gateway to which a call should be routed. In other instances, the routing information could include information identifying the best Internet Service Provider to use to place the call traffic onto the Internet. In addition, the routing controller may know that attempting to send data packets directly from the originating gateway to the destination gateway is likely to result in a failed call, or poor call quality due to existing conditions on the Internet. In these instances, the routing information may include information that allows the data packets to first be routed from the originating gateway to one or more interim gateways, and then from the interim gateways to the ultimate destination gateway. The interim gateways would simply receive the data packets and immediately forward the data packets on to the ultimate destination gateway.

Step 420 may also include updating the call state library, for example with a call state of "set up" once the route has been generated. Next, a CDR may be generated in step 425. The CDR is a record that is created in a database, in which call information will be stored. Each CDR will reflect information about a particular call, or call attempt.

Once a CDR is available, the CDR may be stored in step 430 and sent to the traffic analysis engine in step 435. In one embodiment, steps 430 and 435 may be performed in parallel, as shown in FIG. 4. In alternative embodiments, steps 430 and 435 may be performed sequentially. In yet other embodiments, only step 430 or only step 435 may be performed.

Figure 5:
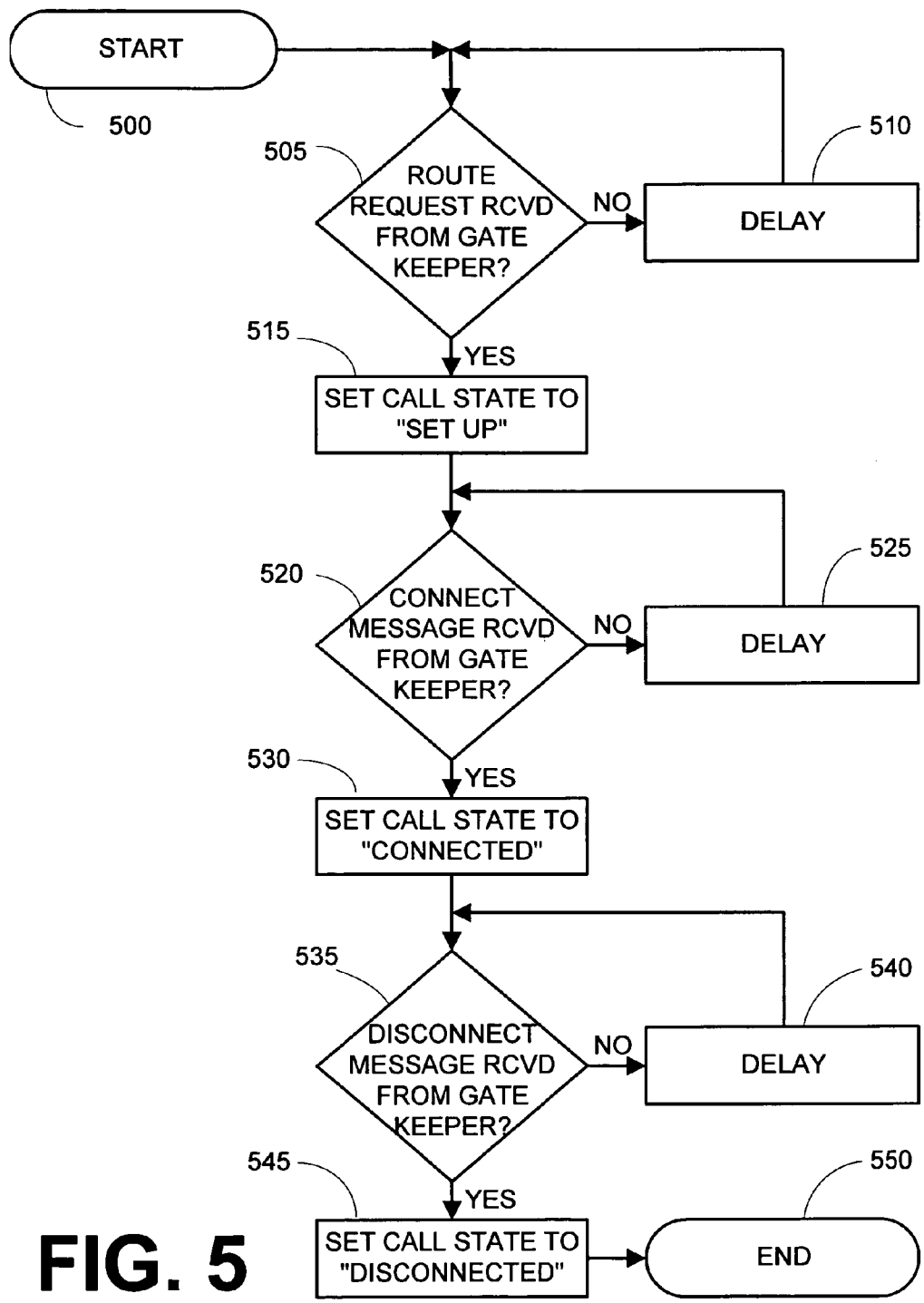
FIG. 5 is a flow diagram illustrating a method for maintaining a call state, according to a preferred embodiment of the invention.

FIG. 5 is a flow diagram illustrating a method for maintaining a call state, which may be performed by routing engine 305. This call state information may be stored in the CDR, or call state information can be stored in a separate location. After starting in step 500, the process may determine in step 505 whether a route request has been received from a gatekeeper or other source. If a routing request has not been received, the process may advance to a delay step 510 before returning to decision step 505. If, however, it is determined in step 505 that a route request has been received, then a call state may be set to "set up" in step 515.

The process of FIG. 5 may then determine in step 520 whether a connect message has been received from a gatekeeper or other source. If a connect message has not been received, the process may advance to delay step 525 before returning to decision step 520. If, however, it is determined in step 520 that a connect message has been received, then a call state may be set to "connected" in step 530.

The process of FIG. 5 may then determine in step 535 whether a disconnect message has been received from a gate keeper or other source. If a disconnect message has not been received, the process may advance to delay step 540 before returning to decision step 535. If, however, it is determined in step 535 that a disconnect message has been received, then a call state may be set to "disconnected" in step 545 before the process ends in step 550.

The process depicted in FIG. 5 will operate to keep the call state for all existing calls up to date to within predetermined delay limits. In alternative embodiments of the invention, the call state monitoring process can monitor for other call states such as "hang-up," "busy," or other call states not indicated above. Moreover, monitoring for other call states may be instead of, or in addition to, those discussed above. Further, in one embodiment, monitoring could be performed in parallel, instead of the serial method illustrated in FIG. 5.

In some embodiments of the invention, the call state for each call may be associated with recorded times. For instance, for a particular call, the call state of setup may be associated with time T1, the call state connected may be associated with time T2, and the call state disconnected may be associated with time T3. This would allow the system to determine that the duration of the call setup was T2−T1. Similarly, the duration of the call would be calculated as T3−T2.

Figure 6:
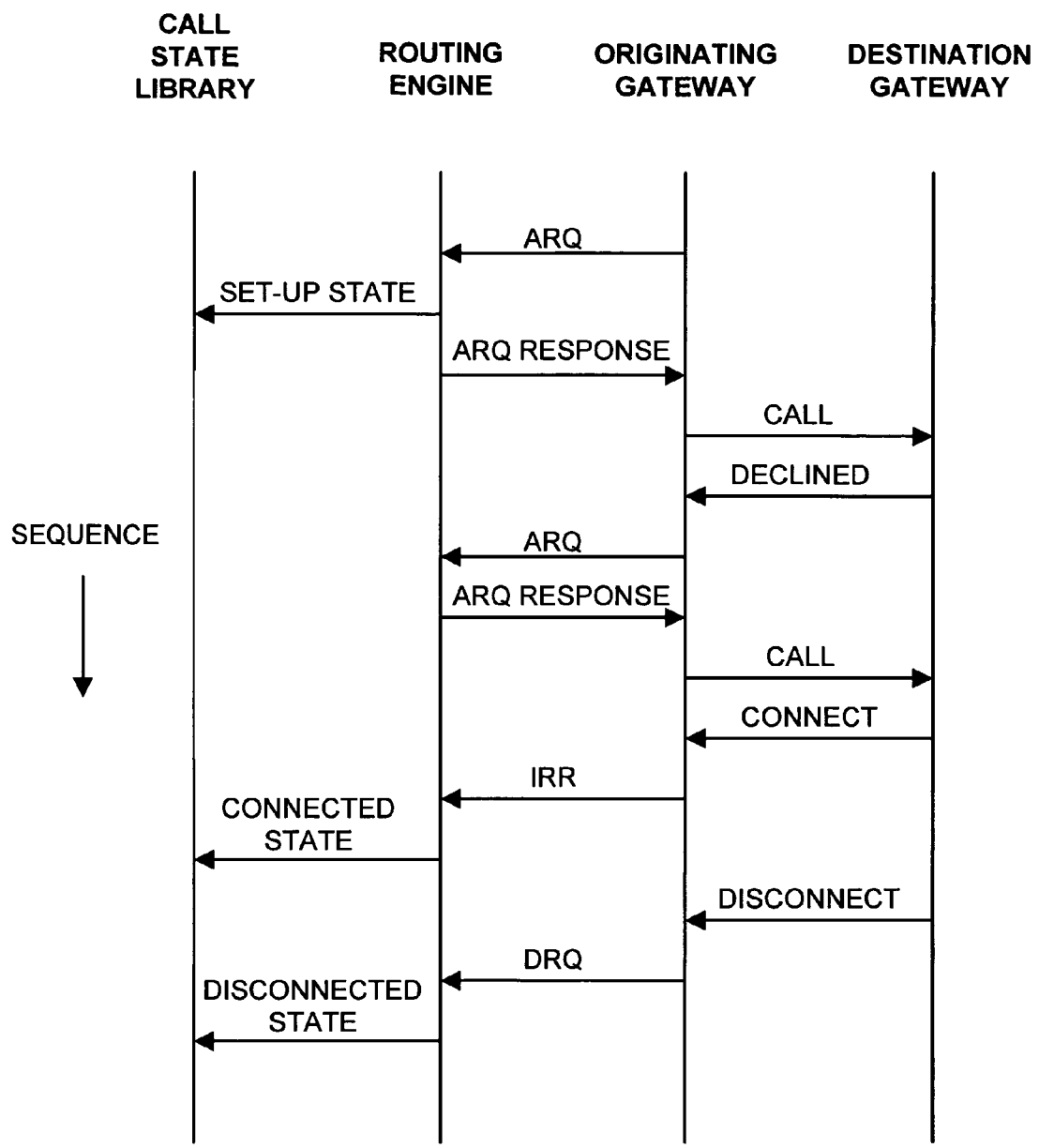
FIG. 6 is a sequence diagram illustrating a method for communicating between functional nodes of a VoIP network, according to a preferred embodiment of the invention.

FIG. 6 discloses a sequence of messages between an originating gateway, a routing engine, a call state library, and a destination gateway, according to a preferred embodiment of the invention. In operation of the network, the originating gateway may send a first request for routing information, in the form of a first Admission Request (ARQ) message, to a routing engine within a routing controller. The request would probably be passed on through a gatekeeper logically positioned between the gateway and the routing engine in the routing controller.

Upon receipt of the routing request, the routing engine may store a set-up state in call state library. The routing engine may then determine a best route based upon one or more predetermined attributes such as the selected carrier service provider, a desired Quality of Service (QoS), cost, or other factors. The routing engine may then send information pertaining to the best route to the originating gateway, possibly via a gatekeeper, as a first ARQ response message. The gateway would then initiate a first call to a destination gateway using the information contained within the response message. As shown in FIG. 6, the destination gateway may return a decline message to the originating gateway.

When the originating gateway receives a decline message, the gateway may send a second request for routing information, in the form of a second ARQ message, to routing engine. Routing engine may recognize the call as being in a set up state, and may determine a next best route for completion of the call. Routing engine may then send a second ARQ response message to the originating gateway. The originating gateway may then send a second call message to the same or a newly selected destination gateway using the next best route. In response to the second call message, the destination gateway may return a connect message to the originating gateway.

The routing engine may use a conference ID feature of the H.323 protocol, which is unique to every call, in order to keep track of successive routing attempts. Thus, upon receiving a first ARQ for a particular call, routing engine may respond with a best route; upon receiving a second ARQ associated with the same call, routing engine may respond with the second best route. If the second call over the next best route does not result in a connection, the originating gateway may send a third ARQ message to routing engine, and so on, until an ARQ response message from routing engine enables a call to be established between the originating gateway and a destination gateway capable of completing the call to the called party.

In alternative embodiments of the invention, the initial ARQ response from the routing engine to the originating gateway may include information about the best route, and one or more next-best routes. In this instance, when a call is declined by one terminating gateway, the originating gateway can simply attempt to route the call using the next-best route without the need to send additional queries to the routing engine.

Once the originating gateway receives a connect message from a destination gateway, the originating gateway may send an Information Request Response (IRR) message to the routing engine to indicate the connect. In response, the routing engine may store a connected state message to the call state library.

After a call is connected, a call may become disconnected. A disconnect may occur because a party has hung up, because of a failure of a network resource, or for other reasons. In this instance, destination gateway may send a disconnect message to the originating gateway. In response, originating gateway may send a Disengage Request (DRQ) message to the routing engine. The routing engine may then update the call state by storing a disconnected state status in the call state library.

Information relating to each telephone call routed over the Internet may be obtained and stored as described above. In traditional systems, the information is then later compiled with rate information to generate billing data. This billing data can then be used to bill the clients that placed calls through the system. The information can also be used to verify charges submitted by third parties that were used to complete the calls.

For instance, a CDR for a particular call would indicate information about the party that requested that the call be made, information about the called party, and possibly the carrier used to complete the call. If this information is not directly stored in the CDR, the CDR would at least include information from which these things could be determined.

The system will have pre-negotiated rates for placing calls for the party making the call request. Similarly, the system will have pre-negotiated rates with third party carriers for completing calls from the Internet to the ultimate called parties. Once the system knows where the call came from, where the call went to, and how long the call lasted, the system can determine: (1) how much to charge the calling party, and (2) how much it will have to pay to a third party for completing the call.

Typically the call information contained in the CDRs is compiled with the rate information as part of a batch processing method that occurs only periodically. In some instances, the system would perform this batch processing for all calls that occurred during a 24 hour period at a point in time when excess processing capacity exists. For instance, if system processing assets are available between midnight and 5 am, the batch processing could be performed at this time to effectively utilize the excess processing capacity that exists at this point in the day.

The result of the batch processing would be billing information that can be submitted to the clients who use the system to place calls. Depending on the client, this information could be presented in many different ways. Another result would be estimates of what third party carriers will charge for calls that were completed to called parties.

While batch processing allows for efficient use of system processing capacity, there are several drawbacks to compiling the call rate and billing information in this fashion. First, the billing information is not available until the batch processing has been performed. This could result in a delay of a day or more. Second, if there is a particularly large volume of calls, batch processing may not allow the system to keep up.

To avoid the above drawbacks of batch processing, the inventors have devised a way of processing call information almost immediately after a call is completed, or immediately after a call is re-routed. This allows billing information to become available almost immediately after a call is completed or re-routed. It also avoids problems with batch processing consuming extremely large amounts of processing capacity during certain times of the day since the call processing is spread out over the day. In addition, because the information contained in the CDRs is processed in "real time" or near real time, the system can use the information to make better routing decisions and to help identify problems on the network.

Figure 7:
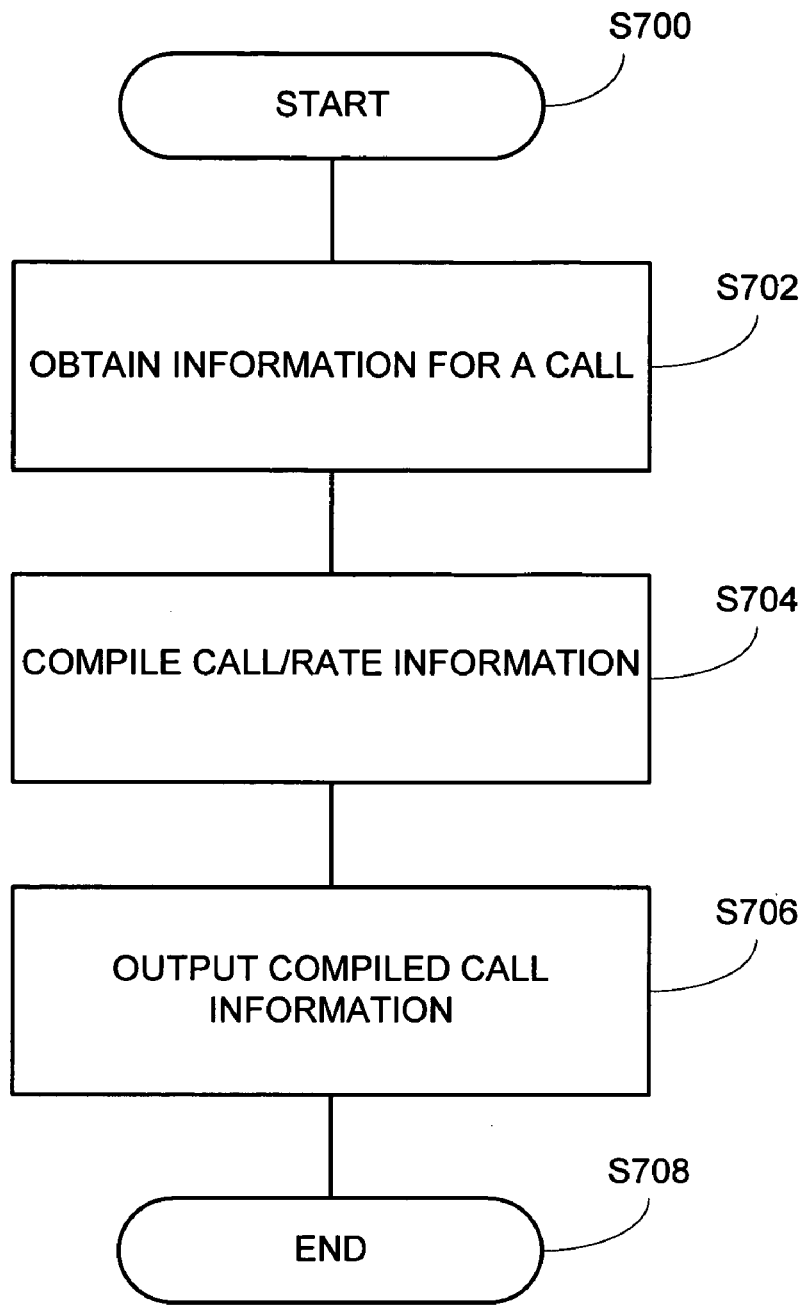
FIG. 7 is a flow diagram of a method embodying the invention.

FIG. 7 shows a flow diagram of an exemplary method embodying the invention for recording and compiling information relating to a telephone call routed over the Internet. The end result of the process is the creation of a final call detail record (CDR) for a call.

In a typical method embodying the invention, a preliminary or initial CDR will be created each time a call request is received from a customer. That the CDR will be updated as the call processing proceeds. Once the call is completed, or re-routed, a final CDR would be created and stored.

When a call setup request is received, the initial CDR would be created. At this point in time, the CDR could include information about the destination telephone number, and the individual/carrier who is making the call request. The CDR might also indicate the telephone number of the calling party. The system would then attempt to place the call. This would involve attempting to complete the call through a destination service provider. As mentioned above, it may require several call setup attempts before the call can be completed to the called party. Each call setup attempt would be recorded and that information would become part of the CDR. Any re-routes that occur would also become part of the recorded information. The amount of time required to complete the call to the called party might also be recorded. If the call cannot be completed, this information would also become part of the CDR, along with the reason that the call could not be completed.

Assuming the call is completed to the called party, the routing to be used for the call is certain, and the CDR could be updated to include an indication of the destination carrier that has completed the call to the called party. The CDR would then be updated as the call progresses to indicate the duration of the call, as this information should be available from the gateway. Once the call is completed, the final total duration will be known and recorded. Alternatively, the beginning and end times of the call might be recorded, which would allow the duration to be calculated at a later time. Also, if the call is terminated without either the calling party or the called party hanging up, which probably indicates a problem, this information could also be recorded.

A variety of other information could also be recorded in the CDR. For instance, the outgoing and incoming trunk group might be recorded. The actual originating and destination gateways used to route the call might be recorded. If the call is deliberately routed through interim gateways, the identity of the interim gateway(s) might also be recorded. The Internet Service Provider used to place the call data onto the Internet might be recorded. An indication of how the call was terminated might be recorded. As will be appreciated, many other items of date could also be recorded in the CDR.

A general method embodying the invention is shown in FIG. 7. The operation begins in step S700 and proceeds to step S702 where call information relating to a telephone call, is obtained. This obtaining step could involve each of the operations described above where information about the call is recorded into the initial CDR, and where that information is updated as the call processing is continued. Much of this information will be available from the core system assets. In some instance, however, the system might also consult additional sources of information about a particular call. For instance, the system might also consult a RADIUS server to obtain information about a particular call. The use of a unique call identification number could allow the system to match up information from an initial CDR with information stored in locations such as a RADIUS server.

Some kinds of information may be available from more than a single source. For instance, the call duration is typically recorded by both the Routing Engine, and the RADIUS server. However, the call duration information recorded in the RADIUS server is almost always more accurate than the call duration information stored in the Routing Engine. For this reason, when information is available from more than one source, the system will have pre-determined preferences as to which source is used for the final version of the CDR. The system will always use the more accurate source, unless the information is missing or corrupted in the more accurate source. In that instance, the system would use the information from the less accurate source.

Then, in step S704, all or a selection of the obtained call information may be compiled to create a final CDR for a call. This compilation process will determine various things about the call. One of the primary purposes of the compiling step is to determine billing information. In this instance, rate information would be combined with the call information to determine who should be charged for the call, and how much they should be charged. This step could also involve determining how much the system will have to pay to a destination carrier to complete the call to the called party. Also, during the compiling step the system will pull information available from multiple sources and decide which information to record in the final CDR. As mentioned above, this might involve selecting information from the more reliable source. This might also involve comparing the information available from two or more sources in order to determine what to record.

Once the system has determined what information should appear in the final CDR, in Step S706 the system will record the final CDR in a CDR database. All or portions of the CDR might also be recorded in other locations. For instance, call billing information could be output to a billing management system. In the case of call cost information, the information could be output to a costs management system. If the compiled information relates to identified problems, the compiled information might be sent to a traffic or system monitoring system.

The information output in step S706 could also be used to identify trouble spots in the system. For instance, if many calls being routed to a particular destination gateway are being terminated for technical reasons, and not because the caller or called party terminates the call, this could indicate a problem with that destination gateway. System personnel could then initiate diagnostics or a physical check to see if there is a problem. Because this information is being output in real-time, or at least quickly after the problem has been noted (near-real-time), rather than after batch processing at the end of the day, trouble spots can be identified much more quickly than with the old batch processing system.

Various portions of the call information might also be sent to a traffic monitoring and analysis system. A traffic monitoring and analysis system could receive information about each of the calls handled by the system so that traffic trends can be spotted. For instance, the system could note when traffic to a particular destination is increasing to alert system personnel that additional capacity may become necessary in the future. Similarly, if the monitoring and analysis system notes that traffic is decreasing to a particular location, system personnel could be alerted to purchase less assets in that area. Here again, because the CDRs are being completed immediately after the calls are completed, or immediately after a call is re-routed, the information within the CDRs can be used to quickly react to changing traffic conditions.

In a similar manner, if the call information output in Step S706 indicates that many calls placed through a particular Internet Service provider are experiencing call quality problems, the system can decide to route calls through a different Internet Service Provider. Again, because the information is complied and output immediately after the calls are completed or re-routed, trouble spots can be quickly identified and corrected.

Figure 8:
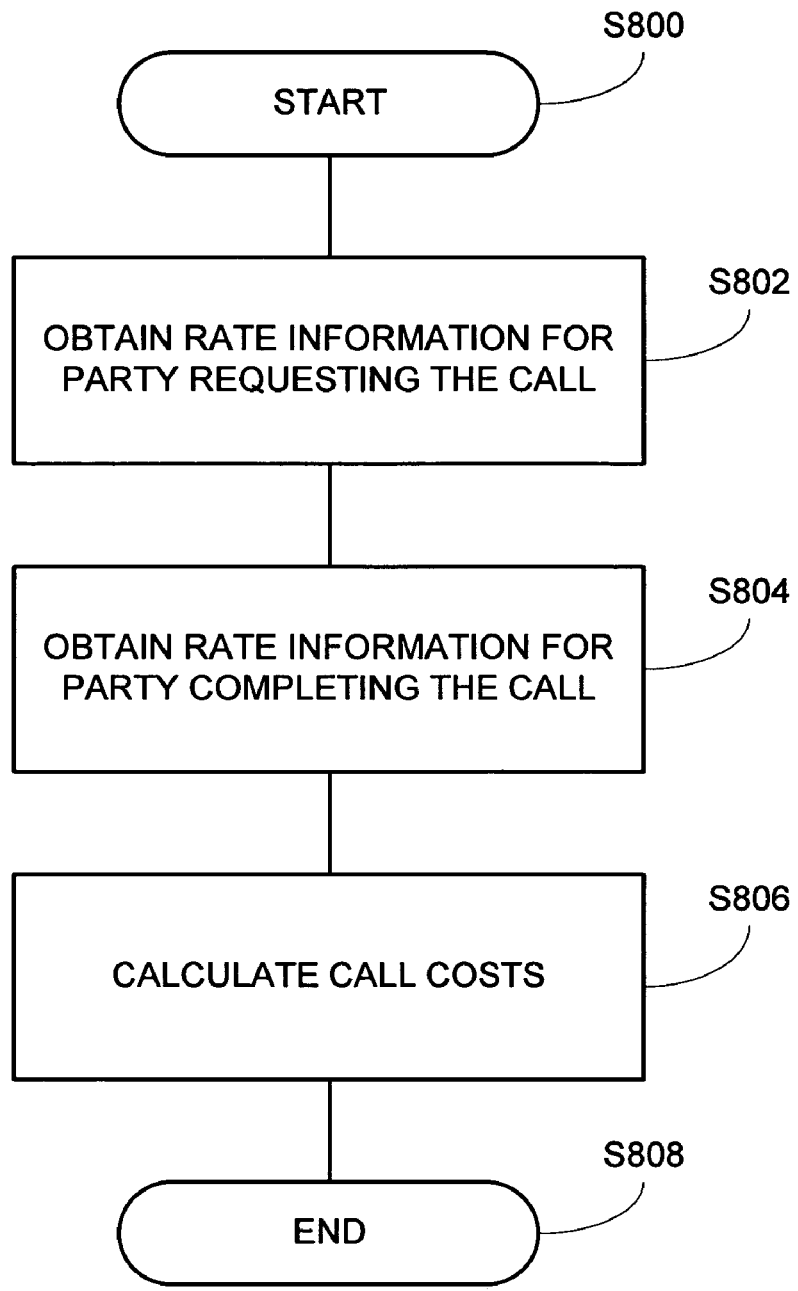
FIG. 8 is a flow diagram of another method embodying the invention.

FIG. 8 depicts a flow diagram that represents a method of compiling financial call information that embodies the invention. This method generally corresponds to step S704 in the method shown in FIG. 7.

The method begins at step S800, and proceeds to step S802 where rate information for the party or service provider requesting the call is obtained. In some instances, the requesting party (who will ultimately be billed) would be an individual. In other cases, the requesting party could be a service provider who routes long distance calls through the system, and who acts as a middleman between the system and an individual. Regardless of who will be billed, the system would almost always have a set of pre-negotiated rates that will apply for the requesting party. These rates might vary depending on the time of day and the intended destination of the call. In addition, one rate might apply for a first number of calling minutes, and a second rate might apply for additional calling minutes. In fact, all sorts of different rate variables might be involved. But regardless of the rate details, the system should be able to obtain the rate for the requesting party.

In step S804, the system would obtain rate information for the party that will complete the call to the called party. This would typically be a local or national telephone service provider in the location of the called party. In some instance, this could include more than one party. For instance, one party at the destination location might be responsible for pulling the data traffic off the Internet, while another party is responsible for completing the call to the called party.

The rate information for the party completing the call would also typically be pre-negotiated. It would usually be dependent on the location of the called party, with different rates being used for different cities or locations. The rates might vary depending on the time of day. In addition, a first rate might apply for the first number of minutes placed through the destination carrier, and a second rate might apply for additional minutes placed through the destination carrier. In that case, the system would have to know how many minutes of calling time has already been placed though the destination carrier before the system would know which rate to use. Thus, the step of selecting the appropriate rate might require that the system obtain information from a variety of sources that have nothing to do with the actual call itself.

In step S806, the system would then use the information about a particular call reflected in the CDR for the call, and the rate information obtained in steps S802 and S804 to calculate call costs and/or call revenue. This would include the costs to be charged to the party requesting the call, the costs that will likely be charged by the destination carrier completing the call, and possibly the revenue to be derived from calls. In some embodiments of the invention, only the charges for the party requesting the call might be calculated. In that instance, step S804 would be unnecessary.

Figure 9:
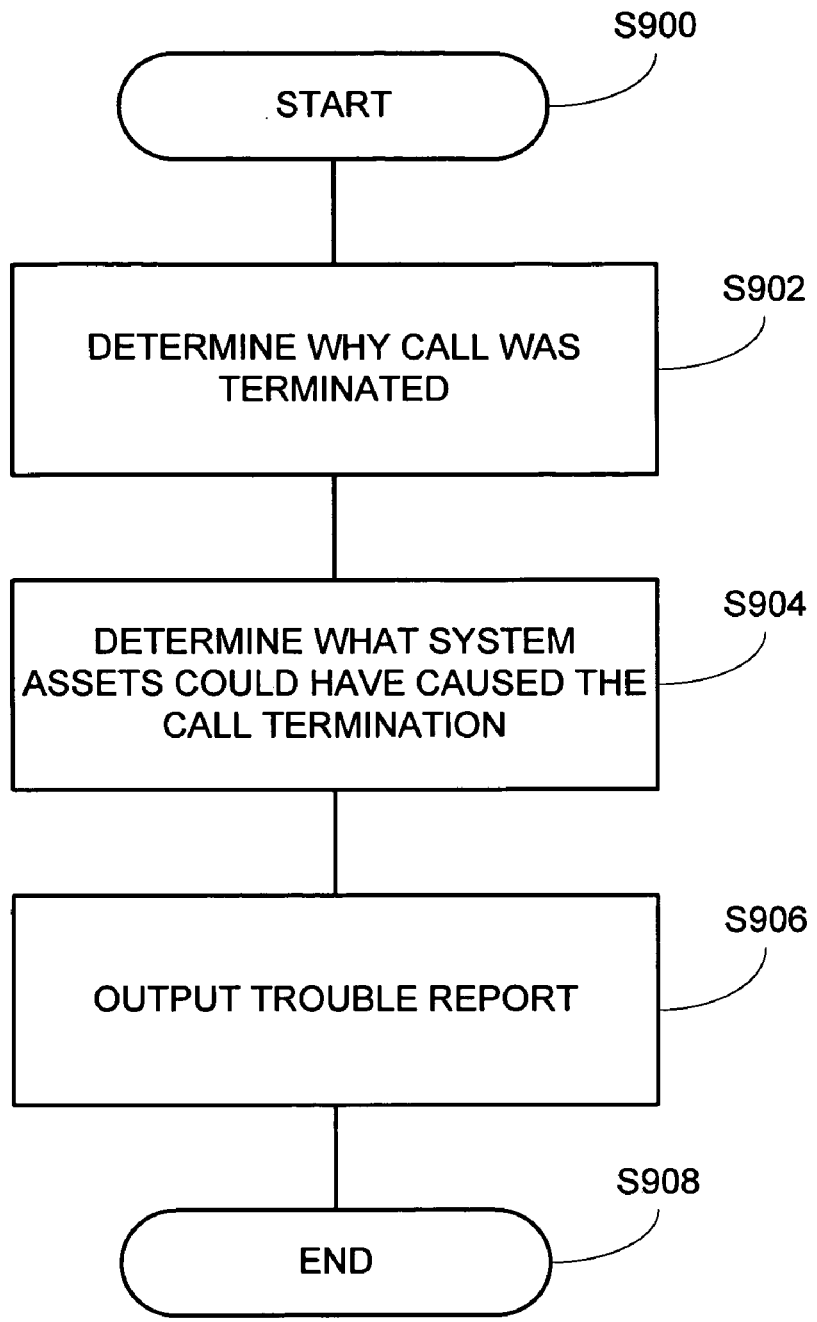
FIG. 9 is a flow diagram of yet another method embodying the invention.

FIG. 9 also depicts a method embodying the invention. In this method, the system uses the information gathered during a call to identify potential problems with the system. This method could also correspond to step S704 of the method shown in FIG. 7. In alternate embodiments, the method shown in FIG. 9 could be performed after the method shown in FIG. 7 has been completed, and after the final CDR for one or more calls have been recorded in the CDR database.

This method begins at step S900, and proceeds to step S902 where the system determines why a call was terminated. In particular, the system is looking to determine if a call was terminated by the failure of a system asset, rather than because the calling party or the called party hung up the phone. If the system determines that the call was terminated because of the failure of a system asset, then in step S904 the system attempts to determine what particular assets could have caused the call termination. For instance, the call may have been improperly terminated because of a problem with the originating, interim or terminating gateways. Alternatively, the call may have experienced a problem because of an Internet Service provider problem, or because of a problem with the originating or terminating service provider. If possible, the system will attempt to pinpoint the exact cause of the problem. This information may be recorded in a CDR, or the information may be derived from the information recorded in a CDR.

Also, the system might be able to examine multiple CDRs to spot trends. For instance, if the system notes that a CDR for a particular indicates that the call was prematurely terminated, the system could then look for other CDRs for calls placed through the same terminating gateway. If the CDRs indicate that multiple calls through the same terminating gateway have been prematurely terminated, the system could conclude that there is a problem with the terminating gateway.

Similarly, the system might look at multiple CDRs for calls placed through the same destination service provider, for calls using the same Internet Service Provider, or for multiple calls requested by the same requesting party. If this information indicates a common thread for multiple premature call terminations, the system may be able to pinpoint the likely problem. Of course, many other types of information in the CDRs could be analyzed to locate potential problems.

Finally, in step S906, a trouble report would be issued.

If a trouble report indicates that a particular asset is causing call terminations, system personnel could initiate corrective action. System personnel could also use the information contained in trouble reports to spot trends. For instance, the trouble reports might indicate that calls placed through a particular destination service provider tend to fail between certain hours of the day. If this continues to be true, then the system could be configured to avoid that destination service provider during the problematic times of the day. Here again, because the information about calls is being output immediately after the calls are terminated, the system can react more quickly to solve or overcome problems.

The same process that is shown in FIG. 9 to identify why calls are being terminated could also be used to identify calls that were declined. That is, call setup requests that did not result in a completed call. Again, the system would utilize information about declined calls to try to determine why the calls were declined. For instance, the system might note that a particular destination gateway or a particular destination service provider is declining an abnormally large number of calls. This information would then be output to system personnel for corrective action. For instance, the call routing engine might be modified to avoid problematic destination gateways or destination service providers. By immediately tracking call declines and by immediately attempting to determine why the declines are occurring, the system can take quick corrective action to correct problems. This, in turn, will ensure that the largest possible number of calls are carried by the system, thereby increasing revenue.

Figure 10:
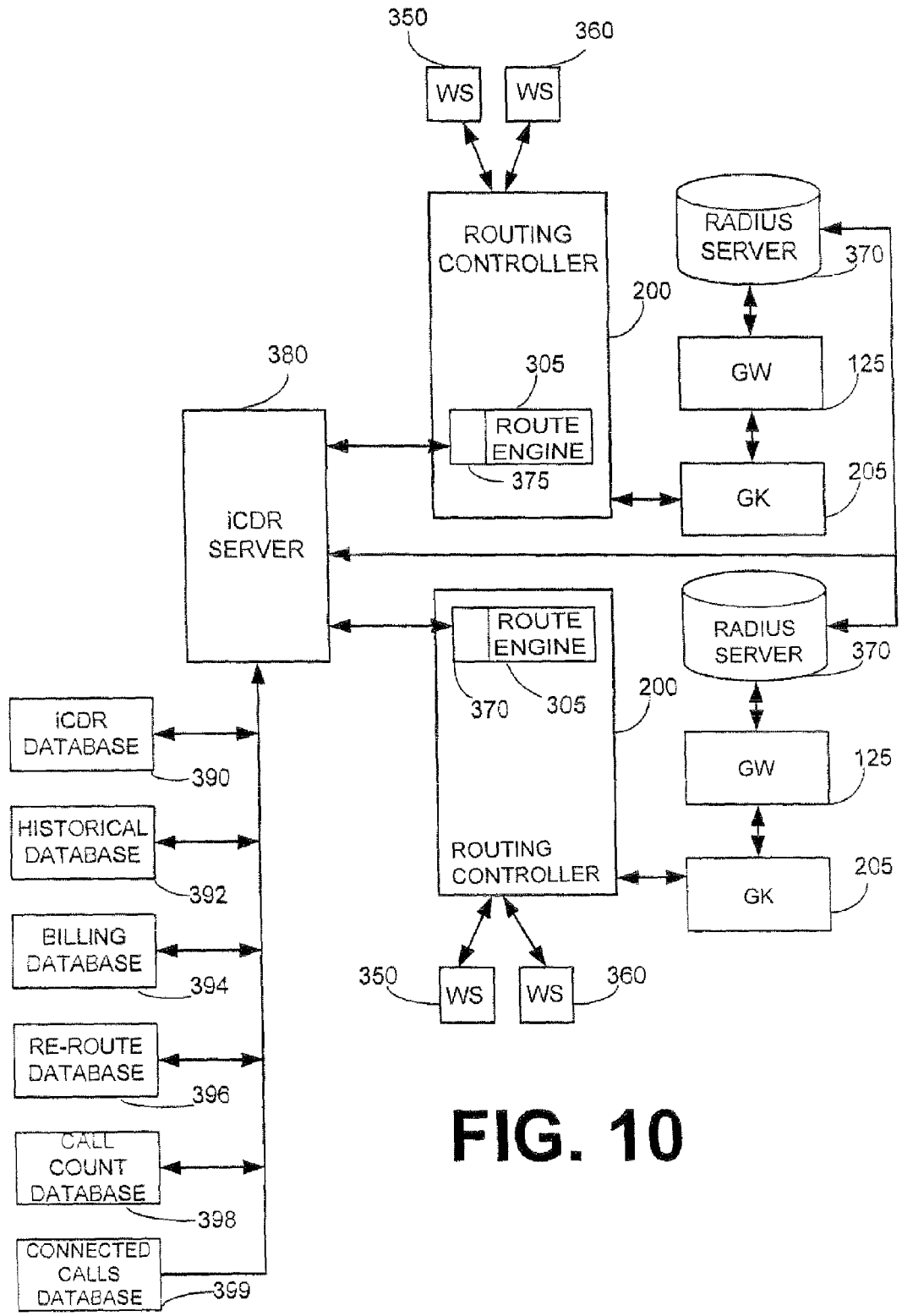
FIG. 10 is a block diagram of a system for monitoring the status of calls placed on a system, and for compiling information about the calls immediately after the calls are terminated.

FIG. 10 is a schematic diagram of an exemplary system architecture for improved compiling of information relating to a telephone call routed over the internet. As shown in FIG. 10, the system includes a routing controller 200 containing a routing engine 305 coupled to an iCDR subportion 375. The iCDR subportion 375 is linked to a central iCDR server 380.

The routing controller 200 is linked to a gateway 125, and a gatekeeper 205. The routing controller 200 is also linked to client workstations 350 and 360. The central iCDR server 380 is linked to several databases such as a real time iCDR database 390, a historical database 392, a billing database 394, a rerouting database 396 and a call count database 398. The iCDR server could also be linked to external sources of call information, such as a RADIUS server 370.

As shown in FIG. 10, the routing controller 200 generates information used to inform the gateway 125 about where the packets containing information should be sent. The gatekeeper 205 performs admission control, address translation, call signaling, call management, or other functions that allow communication of voice and facsimile traffic over the networks. The gatekeeper 205 may also provide an interface between different gateways and the routing controller 200. The gatekeeper 205 may also transmit routing requests to the routing controller 200, receive an optimized route from the routing controller 200 and execute the route accordingly.

The routing engine 305 receives the routing request from the gatekeeper 205 and may determine the best routes for the call traffic based on many factors. The routing engine 305 may also generate routing information that includes a destination gateway address and/or a preferred Internet service provider. The iCDR portion 375 coupled to the routing engine 305 reports the status of calls to the central iCDR server 380 during call connection attempts. For instance, when a call enters a set-up state, the iCDR portion 375 sends a start signal for the set-up state to the central iCDR server 380. When the set-up state is completed, the iCDR portion 375 sends a completed signal to the central iCDR server 380. Thereafter, when a call enters a connected state, the iCDR portion 375 sends a start message to the central iCDR server 380. When the call connect state is completed, the iCDR portion 375 sends a completion message to the central iCDR server 380. Thus, a CDR for the call, stored within the iCDR server is updated each time the status of the call changes.

The central iCDR server 380 also may record the status of calls and the call information received from the iCDR portion 375 in the various databases 390-398. Additionally, the central iCDR server 380 may compile information relating to a call as soon as the call is completed using the information in the CDR for the call. This would involve one or more of the methods described above for generating billing information, compiling trouble reports for declined or improperly terminated calls, or for other methods that utilize call information.

The central iCDR server 380 may also prepare billing information as well as billing summary reports by compiling the status of calls, the call information, the CDR, the rate information, and/or the billing information. Alternatively, other portions of the system could prepare the billing information using information stored in the iCDR server, the billing database, and/or other sources of call and rate information.

The central iCDR server 380 may also be configured to keep track of the total number of active calls and possibly also the number of re-routed calls in each of the incoming and outgoing trunk lines or groups according to the call state being reported from the routing engine 305. This information can also be recorded in the Call Count Database 398. By tracking the total number of active calls, the re-routed calls, and what trunks the calls are on, the system can track how much system capacity exists. The system might also include a connected calls database 399, which is a listing of all calls that are presumed to be connected.

The information stored in various databases 380-399 may be used by the central iCDR server 380 to create various different reports. Such reports could be issued on an hourly, daily, weekly, monthly, and/or annual basis. Such information may be utilized to make appropriate system changes such as obtaining more capacity to each incoming and outgoing trunk lines or groups or securing more bandwidth going towards a specific area, region and/or country.

The central iCDR server 380 further may be configured to monitor the status of each of the system components such as the status of each incoming and/or outgoing trunk groups. Should a problem develop in one of the system components, such as a gateway, the central iCDR server 380 could communicate this problem to the routing engine 305 so that routes that include the affected component are not used for additional calls. Obviously, this prevents calls from being routed to non-functioning gateways or gateways encountering problems.

The radius server 370 stores many items of call information. These include data necessary for billing of network services. The radius server 370 may also store data such as the incoming trunk group, call duration, and the IP address of gateways or carriers. The radius server 370 may be configured to store the call information needed to compile the CDRs. For this reason, the Radius Server 370 would be linked to the iCDR Server 380, which would allow the iCDR server to use information from both the iCDR portion 375 of the Routing controller 200, and information from the RADIUS Server 370 to compile call information for final CDRs.

The client workstations 350 and 360 may be coupled to the routing controller 200 to provide a user interface. The client workstations 350 and 360 may also provide access to any data or call information in the databases 390-398, the central iCDR server, or information about other system components in the routing controller 200 as well as the radius server 370, the gateway 125, and the gatekeeper 205.

As explained above, in a system and method embodying the invention, where call information is compiled immediately after calls are completed or re-routed, the system can generate billing information more quickly than prior art systems where the billing information is batch compiled. In addition, the system can react more quickly to changing system conditions and to developing problems. This helps to ensure that the system derives maximum revenue from potential calls, and that the system maintains the highest possible system availability.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A computer implemented method of compiling information relating to a telephone call routed over the Internet, comprising:

obtaining call information relating to a telephone call with a computer immediately after the call is completed, the obtained call information including information about why the call was terminated;

compiling the call information with a computer immediately after the call is completed;

outputting the complied information, with a computer, into a computerized database; and identifying potential trouble spots on the network used to complete the telephone call, with a computer, based on the obtained call information, wherein the identifying step includes determining what might have caused the call termination.

2. The method of claim 1, wherein the plurality of call information relates to at least one of an originator, recipient, date, time, duration, incoming trunk group, outgoing trunk group, call states, and an IP address.

3. The method of claim 1, wherein the obtaining step comprises obtaining rate information for the call, and wherein the compiling step comprises using the obtained call information to calculate what to charge a customer for completing the call.

4. The method of claim 3, wherein the compiling step further comprises determine what it costs to complete the call.

5. The method of claim 1, further comprising outputting a trouble report that identifies potential trouble spots on the network used to complete the telephone call using the obtained information about why the call was terminated.

6. The method of claim 1, wherein the obtaining step comprises obtaining information about why a call was declined, and wherein the identifying step comprises determining what may have caused the call to be declined.

7. The method of claim 6, further comprising outputting a trouble report that identifies potential trouble spots on the network used to complete the telephone call using the obtained information about why the call was declined.

8. A system for compiling information relating to a telephone call routed over the Internet, comprising:
    means for obtaining call information relating to a telephone call immediately after the call is completed or re-routed, the obtained call information including information about why the call was terminated or re-routed;
    means for compiling the call information immediately after the call is completed or re-routed;
    means for outputting the complied information into a computerized database; and
    means for identifying potential trouble spots on the network used to complete the telephone call based on the obtained call information, wherein the means for identifying determines what might have caused the call to be terminated or re-routed.

9. The system of claim 8, wherein the obtaining means is configured to obtain rate information for the call, and wherein the compiling means is configured to use the obtained call information to calculate what to charge a customer for completing the call.

10. The system of claim 9, wherein the compiling means is also configured to determine what it costs to complete the call.

11. The system of claim 8, further comprising means for outputting a trouble report that identifies potential trouble spots on the network used to complete the telephone call.

12. The system of claim 8, wherein the obtaining means is configured to obtain information about why a call was declined, and wherein the identifying means is configured to determine what may have caused the call to be declined.

13. The system of claim 12, further comprising means for outputting a trouble report that identifies potential trouble spots on the network used to complete the telephone call.

14. The method of claim 1, wherein the identifying step comprises determining when call traffic placed through certain assets of the network used to complete the telephone call are approaching the maximum capacity of those assets.

15. The method of claim 1, wherein the identifying step comprises determining when there is a problem with a destination gateway.

16. The method of claim 1, wherein the identifying step comprises determining when there is a problem with an originating gateway.

17. The method of claim 1, wherein the identifying step comprises determining when there is a problem with an Internet service provider.

18. The method of claim 1, wherein the obtaining step comprises:
    obtaining copies of at least one item of information about the telephone call from two different devices in the network used to complete the telephone call; and
    selecting one of the copies of the at least one item of information for use in the compiling step.

19. The method of claim 18, wherein the selecting step comprises selecting the copy of the at least one item of information supplied by the device that is usually more accurate in recording the at least one item of information.

20. The system of claim 8, wherein the identifying means determines when call traffic placed through certain assets of the network used to complete the telephone call are approaching the maximum capacity of those assets.

21. The system of claim 8, wherein the identifying means determines when there is a problem with a destination gateway.

22. The system of claim 8, wherein the identifying means determines when there is a problem with an originating gateway.

23. The system of claim 8, wherein the identifying means determines when there is a problem with an Internet service provider.

24. The system of claim 8, wherein the obtaining means obtains copies of at least one item of information about the telephone call from two different devices in the network used to complete the telephone call, and wherein the compiling means uses only one of the copies of the at least one item of information.

25. The system of claim 24, further comprising means for selecting the copy of the at least one item of information which is supplied by the device that is usually more accurate in recording the at least one item of information.

26. A computer implemented method of identifying potential trouble spots on a system used to complete telephone calls routed over the Internet, comprising:
    obtaining call information relating to a first telephone call with a computer immediately after the first call is completed, the obtained call information including information about why the first call was terminated;
    reviewing call information, with a computer, relating to other telephone calls that were recently completed using at least one of the same system assets used to complete the first telephone call, the reviewing step including reviewing information about why the other telephone calls were terminated;
    determining, based on the results of the reviewing step, if a particular system asset used to complete the first telephone call and at least one of the other telephone calls may have been responsible for an undesired termination of one or more telephone calls; and
    generating a report, with a computer, that identifies potentially defective system assets using information developed during the determining step.

27. The method of claim 26, wherein if, during the determining step, a determination is made that other telephone calls carried through the same originating gateway as the first call were terminated prematurely, then the originating gateway is identified as a potentially defective system asset.

28. The method of claim 26, wherein if, during the determining step, a determination is made that other telephone calls carried through the same terminating gateway as the first call were terminated prematurely, then the terminating gateway is identified as a potentially defective system asset.

29. The method of claim 26, wherein if, during the determining step, a determination is made that other telephone calls carried by the same Internet Service Provider as the first call were terminated prematurely, then the Internet Service Provider is identified as potentially defective.

30. A computer implemented method of identifying potential trouble spots on a system used to complete telephone call routed over the Internet, comprising:
- obtaining call information relating to a first failed call setup attempt with a computer immediately after the first call setup attempt fails, the obtained call information including information about why the first call setup attempt may have failed;
- reviewing call information, with a computer, relating to other failed call setup attempts that recently occurred and that used at least one of the same system assets as were used in the first failed call setup attempt, the reviewing step including reviewing information about why the other failed call setup attempts may have failed;
- determining, based on the results of the reviewing step, if a particular system asset used in the first failed call setup attempt and at least one of the other failed call setup attempts may have been responsible for the failed call setup attempts; and
- generating a report, with a computer, that identifies potentially defective system assets using information developed during the determining step.

31. The method of claim 30, wherein if, during the determining step, a determination is made that a plurality of the other failed call setup attempts were carried through the same originating gateway as the first failed call setup attempt, then the originating gateway is identified as a potentially defective system asset.

32. The method of claim 30, wherein if, during the determining step, a determination is made that a plurality of the other failed call setup attempts were carried through the same terminating gateway as the first failed call setup attempt, then the terminating gateway is identified as a potentially defective system asset.

33. The method of claim 30, wherein if, during the determining step, a determination is made that a plurality of the other failed call setup attempts were carried by the same Internet Service Provider as the first failed call setup attempt, then the Internet Service Provider is identified as potentially defective.

* * * * *